3,004,965
PROCESS AND INTERMEDIATES FOR PREPARING STEROIDAL 17→18 LACTONES
James F. Kerwin, Broomall, and Manfred E. Wolff, Elkins Park, Pa., assignors to Smith Kline & French Laboratories, Philadelphia, Pa., a corporation of Pennsylvania
No Drawing. Filed Aug. 7, 1959, Ser. No. 832,165
23 Claims. (Cl. 260—239.5)

This invention relates to novel intermediates for preparing steroids having a $C_{17} \rightarrow C_{18}$ γ-lactone moiety of use as therapeutic agents or as intermediates for preparing compounds having hormone activity using synthetic routes well-known to those skilled in the art. This invention also relates to novel processes for preparing these lactone compounds.

One object of this invention is the facile preparation of intermediates useful in preparing steroids having an oxygenated function, such as a hydroxymethylene or formyl group, at the 18-position. The structure of such steroids resembles aldosterone and the steroids possess therapeutic activity as antialdosterone or diuretic compounds. Alternatively, when the remainder of the steroid nucleus resembles well-known steroidal drugs, such as testosterone or cortisone, the 18-oxygenated products of each of these compounds have anabolic or anti-inflammatory activity, respectively.

Another object of this invention is the preparation of steroids having hormone activity, such as diuretic and other therapeutic activity in their own right in addition to their use as intermediates.

Another object of this invention is a novel, overall process for transforming substituted conanines having the typical $C_{17} \rightarrow C_{20}$ pyrrolidine ring structure into steroidal $C_{18} \rightarrow C_{17}$ lactones without complicating rearrangement reactions and in good yield.

Another object of this invention is a one-step chemical process for preparing $C_{18} \rightarrow C_{17}$ lactones characterized by the intramolecular displacement of a steroidal trimethylammonium radical by a carboxylate anion.

The utility of the 17→18 γ-lactone derivatives as intermediates prepared by this process and with these intermediates is readily apparent to one skilled in the art and is described more precisely by the following literature references: U.S. Pat. No. 2,847,425; U.S. Pat. No. 2,847,412; Helv. Chim. Acta 37, 1200 (1954); and British Patent No. 805,604. Additionally, the lactones of Formula VI, below, have hormone activity, such as antialdosterone activity, in their own right.

The overall process of converting compounds having the conanine skeleton into $C_{17} \rightarrow C_{18}$ lactones is outlined as follows:

Formula I

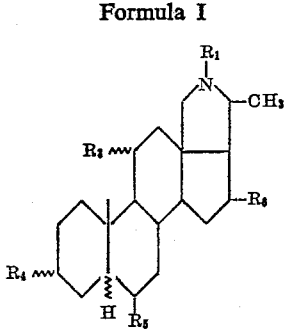

and

Formula II

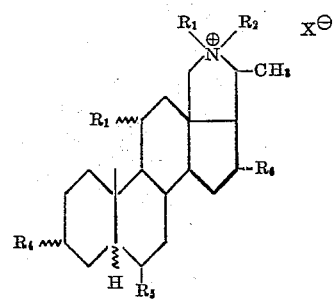

in each of which formulas.

Preferably, the compounds represented by Formulae I–VI are as follows:
$R_1$, $R_2$ and $R_7$ are methyl;
$R_3$ is hydroxy or, taken together with the carbon atom to which it is attached, a keto;
$R_4$ is acetoxy, hydroxy or, taken together with the carbon atom to which it is attached, keto;
$R_5$ and $R_6$ are hydrogen;
ξ is α or β; and
X is halo of a minimum atomic weight of 35 or hydroxyl.

It will be apparent that the reaction sequences of this invention can be applied to compounds analogous to those described above which have other ring substituents stable to potassium permanganate or strong alkali, such as halogen atoms or substituents at positions other than those mentioned hereabove. The nucleus, however, must be saturated at all times. The best yields are realized with rings A and B in the cis position and with oxygen substituents at the 11-position. Other acyloxy moieties stable under the reaction conditions may be used in place of acetoxy, such as benzoyloxy, propionyloxy, etc. These acyl groups usually are hydrocarbon derivatives having not more than 6 carbon atoms. The term "conanine" used herein is a generic term used to include the pyrrolidine derivatives having 20α or 20β, as well as 5α or 5β, configurations as well as various N-lower-alkyl derivatives. The basic structure of the conanines is that of Formula I. The term "lower alkyl" is used to define alkyl moieties having 1 to 4 carbon atoms inclusive, but preferably methyl. Also preferred are compounds having 3α-substituents with the 5β-configuration and 3β-substituents with the 5α-configuration, since these are readily available Formula III

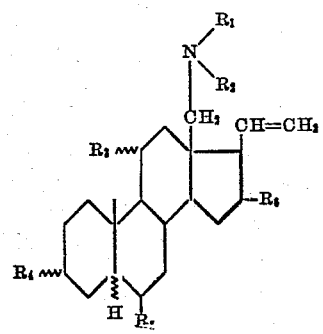

and

Formula IV

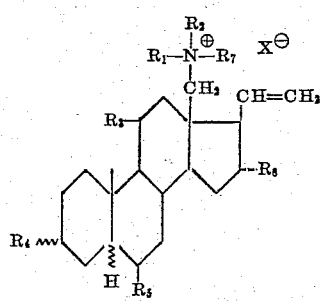

Formula V

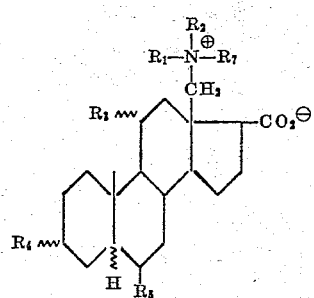

Formula VI

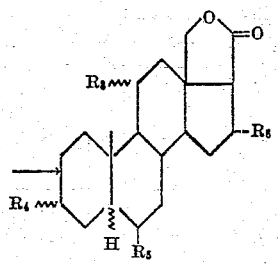

in each of which formulas:

$R_1$, $R_2$ and $R_7$ are lower alkyl of 1–4 carbon atoms inclusive;

$R_3$ is hydrogen, hydroxyl or, taken with the carbon atom to which it is attached, keto;

$R_4$ is hydroxyl, acetoxy or, taken together with the carbon to which it is attached, keto;

$R_5$ is hydrogen, hydroxyl, fluoro or methyl; and $R_6$ is hydrogen, hydroxyl or methyl;

⌇ is either α or β; and

X represents an anion, preferably an inorganic anion such as hydroxyl, methosulfate, chloride, iodide or bromide, which forms a stable quaternary salt.

The overall process uses as starting materials the hydroxide quaternary salts of the conanines of Formula I. The conanines themselves are either known or are prepared from 20-keto compounds with free $C_{18}$ groups having any desired configuration or substitution in the steroidal nucleus. These 20-keto compounds are reacted with an excess of a primary lower alkylamine under mild hydrogenation conditions using platinum oxide catalyst. The resulting 20-monoalkylamine is treated with a halogenating agent, such as N-chlorosuccinimide, to give the 20-(N-haloamine) which is, in turn, irradiated with ultraviolet light in the presence of trifluoroacetic acid to give the desired base of the starting material, an N-alkyl conanine derivative. The conanine is converted into a quaternary derivative, usually with a reactive alkyl halide, such as a lower alkyl iodide, preferably the methyl iodide. This quaternary salt is then converted to the quaternary ammonium hydroxide by exchanging the anion or halide portion with the hydroxyl form of an anion exchange resin prepared by passing 10% sodium hydroxide over the quaternary halide until the halide ion is exhausted.

More specifically, the quaternary conanine of Formula II (X⊖ being a halide) dissolved in an organic solvent in which it is soluble and nonreactive, such as the preferred lower alkyl alcohols, for instance methanol or ethanol, is reacted with an excess of the hydroxide form of an anion exchange resin. Exemplary of the resins (halide form) which can be used are the preferred Amberlite IRA–400, as well as Amberlite IRA–401, Amberlite IRA–410, Amberlite IRA–411, Dowex 1, Dowex 2, Imac S–3 and others. Full descriptions of these resins, including what is known of their sources and chemical characteristics are found in "Ion Exchange Resins" by Kunin, 2nd edition, John Wiley, pages 89–96, and "Ion Exchangers in Organic and Biochemistry" by Calmon and Kressman, Interscience, pages 116–129. Exemplary of the preparation of the anion exchange resins used are those disclosed by U.S. Patents No. 2,591,573, No. 2,689,833, No. 2,689,832 and No. 2,725,361, particularly those of the example of No. 2,591,573 and Example 1 of No. 2,689,833.

The chemical structures of the anion exchange resins detailed above can vary widely. The anion exchange resins may be considered as insoluble, high molecular weight electrolytes. The resin must be sufficiently crossed linked to have negligible solubility, sufficiently hydrophilic to permit diffusion of ions through the structure at a finite and usable rate and chemically stable. The most useful are the strongly basic exchangers of a type 1 resin containing —$NMe_3\oplus$ groups which have a skeleton derived from a monomer of p-trimethyl-aminomethyl-phenylethylene. Otherwise stated, these resins are the hydroxide forms of styrene-type quaternary salts.

The preferred manner of reaction is to pass the quaternary steroid in alcoholic solution over the hydroxide form of the resin in a typical column form, washing the resin with more solvent until the eluate is neutral. The alcohol is then evaporated to leave the steroidal quaternary hydroxide of Formula II when X⊖ is OH⊖. The overall process of converting this quaternary hydroxide starting material into the corresponding 17→18 γ-lactones comprises five steps, each of which is carried out simply and in good yield.

This starting material, prepared as described above, is heated, preferably under vacuum, until the effervescence ceases. The heating period is carried out advantageously from about 150–250° C. at low vacuum, such as from about 5–200 mm. pressure. Preferred conditions are at about 180° C. under about 10–50 mm. pressure. The reaction time is usually about two-to-three minutes to four hours, preferably about 10 minutes to about one hour. The residue is then the crude 18-dialkylamino-$\Delta^{20}$-steroid of Formula III, an intermediate which is also an important object of this invention.

This tertiary amine is quaternized by reaction with a reactive lower alkyl halide in an organic, usually highly polar, solvent in which the reactants are substantially soluble and nonreactive, such as acetonitrile, ethanol, methanol, benzene, dimethylformamide or dimethylacetamide, at temperatures of from about 50–150° C. for 1 to 24 hours, preferably in acetonitrile at reflux. The resulting quaternary salt is converted to the hydroxide by passing over the hydroxide form of an anion exchange resin as outlined hereabove for the preparation of the starting materials of Formula II, X⊖ being OH⊖.

The resulting quaternary hydroxide of Formula IV, X⊖ being OH⊖, is then oxidized at about room temperature with permanganate, such as potassium permanganate, either in the preferred water vehicle or in a water-aqueous miscible solvent not subject to oxidation in which the reactants are substantially soluble. Alternatively, the following oxidation conditions can be employed: A solution of the quaternary hydroxide in water is treated with ozone until ozone uptake is ended. The resulting solution is treated with 30% hydrogen peroxide for about 18 hours, the excess hydrogen peroxide is decomposed with palladium catalyst and the filtered solution is evaporated to yield the desired betaine. Alternatively, other oxidizing agents known to oxidize terminal double bonds, such as chromic acid, are used; with ozone or chromic acid, free secondary hydroxyl groups are oxidized to ketones concomitantly. Therefore, the permanganate oxidation conditions are preferred if the ketone derivatives are not desired as the end products.

The oxidation product is an inner or intramolecular quaternary salt or a betaine of the 18-trimethylamino-17-carboxylate of Formula V, also an object of this invention. This compound is dissolved in an organic solvent in which it is substantially soluble and which is nonreactive with it and with alkali. Particularly valuable as solvents for this step are the formamides and acetamides and their N-lower alkyl derivatives having one or two N-alkyl groups of from 1 to 4 carbons. N,N-dimethylformamide and N,N-dimethylacetamide, or aqueous mixtures thereof, are the preferred and advantageous solvents. The reaction mixture at a basic pH, preferably from about 8 to 14, advantageously about 10 to 13, is heated preferably at from about 50–150° C. but not above the boiling point of the solvent, advantageously from about 75–120° C. until the intramolecular displacement of the quaternary ammonium group is complete, usually from about one to eight hours. The basic conditions can be induced by any suitable base, however, the alkali metal hydroxides particularly sodium or potassium hydroxide solutions are preferred. Actually the alkali metal salt of the hydroxy carboxylic acid intermediate is transiently formed which is not isolated but transformed directly into the lactone by a neutralization reaction, such as treatment with conventional acid reaction such as with hydrochloric acid, acetic acid, sulfuric acid, etc. The reaction product is the 17→18 γ-lactone of Formula VI which is also an object of this invention having utility as an intermediate as described herein.

The 17→18 γ-lactones are, as will be readily recognized by one skilled in the art, important intermediates also for preparing $C_{18}$-hydroxylated steroids having therapeutic activity such as diuretic or, depending on the configuration of the remainder of the steroid nucleus, progestational, anabolic or anti-inflammatory activity when analogous to progesterone, testosterone or cortisone compounds, respectively. The reaction of the lactone intermediates with Grignard reagents proceeds as follows:

Formula VII

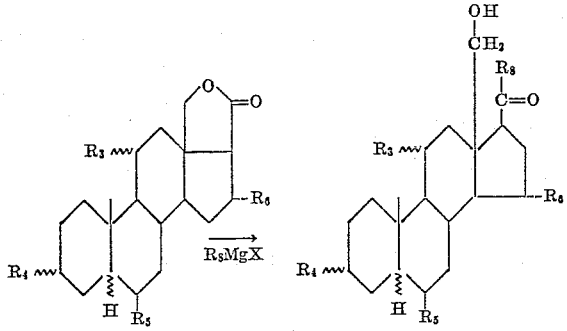

in which $R_3$ is hydrogen, hydroxyl or acetoxy; $R_4$ is hydroxyl or acetoxy; $R_5$ and $R_6$ are hydrogen, hydroxyl or methyl; and $R_8$ is lower alkyl of 1 to 4 carbons, preferably methyl. Other modifications can then be inserted into Formula VII, such as keto moieties for $R_4$ or $R_3$ and $\Delta^{1,2}$ as well as $\Delta^{4,5}$ moieties by methods known to the art. The γ-lactone compounds of Formula VI which have moieties which might interfere with the Grignard reaction, such as keto groups at $R_3$ or $R_4$, are converted into the 18-hydroxy-17-methyl-keto compounds of Formula VII by reducing the 3 and/or the 11-keto moieties with sodium borohydride.

Reaction conditions other than those described herein may well be operative but with no advantage over those described hereabove. The following reactions and synthetic procedure will illustrate this invention and make its practice fully apparent to one skilled in the art. These examples are not to be construed as limiting the operability of this invention but, on the contrary, are indicative of its wide scope of usefulness.

Example 1

A solution of 0.88 g. of 3-hydroxyconanine (Chem. and Ind., 1959, 516) and 1.2 ml. of methyl iodide in 5 ml. of benzene is heated at reflux for two hours. The mixture is cooled, diluted with ether and the resulting solid separated to give 3-hydroxyconanine methiodide, M.P. 256–262° C., $[\alpha]_D^{25}$ +27.5° (c.=0.5% in methanol).

A solution of 1 g. of the methiodide dissolved in methanol is passed through 20 g. of Amberlite IRA–400 resin (hydroxide form). The resin column is washed with methanol until the eluate is neutral. The combined methanol solutions are evaporated to leave the quaternary hydroxide.

This residue is heated at 180° C. under 15 mm. pressure until the bubbles cease. The residue is recrystallized from methanol to give 3β-hydroxy-18-dimethylamino-20-allopregnene, M.P. 156–157° C., $[\alpha]_D^{25}$ +29.0° (c.=1% in chloroform).

A solution of 357 mg. of the olefin in 25 ml. of acetonitrile and 3 ml. of methyl iodide is heated at reflux for 20 hours. The solution is evaporated to leave the methiodide, M.P. 246.5° C. (dec), $[\alpha]_D^{25}$ +28.7° (c.=1% in methanol).

The 3β - hydroxy - 18-trimethylammonium-20-allopregnene iodide is dissolved in methanol and passed over an Amberlite IRA–400 resin (hydroxide) column. The methanol eluate is evaporated to leave the quaternary hydroxide, M.P. 215° C. (eff.).

A solution of 2.85 g. of the quaternary in 50 ml. of water is treated dropwise with a solution of 3.17 g. of potassium permanganate in 80 ml. of water at ambient temperature. The precipitated manganese dioxide is separated and the aqueous filtrate evaporated to give the desired methyl 18-dimethylamino-3β-hydroxy-17β-androstanecarboxylate, betaine.

The carboxylate residue is suspended in 100 ml. of dimethylformamide and adjusted to a pH of 12 with 10% sodium hydroxide solution. The mixture is heated on the steam bath for five hours, then evaporated to dryness in vacuo. The residue is dissolved in water. The solution is treated with charcoal, filtered and made acid with concentrated hydrochloric acid. The resulting precipitate is extracted with ether. The ethereal solution is evaporated to leave the desired 3β,18-dihydroxy-17β-androstanecarboxylic acid, γ-lactone.

Example 2

A solution of 1.7 g. of 3-ketoconanine (Chem. and Ind., 1959, 516) and 2.5 ml. of ethyl bromide in 25 ml. of benzene is heated at reflux for six hours. The mixture is cooled and diluted with ether to give the ethobromide.

Alternatively, a solution of 5 g. of 3-ketoconanine and 7 ml. of methyl iodide in 30 ml. of benzene is heated at reflux for two hours. The mixture is cooled and treated with ether to give the methiodide, M.P. 284–289° C., $[\alpha]_D^{25}$ +65.2° (c.=1% in methanol).

A solution of 2 g. of either quaternary in methanol is passed over a column of Amberlite IRA–400 resin (hydroxide). The methanol eluate is evaporated to give the hydroxide which is heated to 200° C. under 50 mm. pressure until the effervescence stops. After recrystallization, 3-keto-18-dimethylamino - 20 - allopregnene is obtained. The olefin (500 mg.) is reacted with ethyl bromide in acetonitrile at reflux for 12 hours. The solution is evaporated to leave the ethobromide. This crude compound in ethanol is passed over a hydroxide resin column to exchange the bromide with hydroxide. A solution of 2.98 g. of the resulting quaternary hydroxide and 3.50 g. of potassium permanganate in water is reacted at room temperature. After filtration the filtrate is evaporated to leave ethyl 18 - dimethylamino-3-keto-17β-androstanecarboxylate, betaine which is suspended in 150 ml. of dimethylacetamide, adjusted to pH 10 with potassium hydroxide and heated at 210° C. The residue is recrystallized to give 3-keto-18-hydroxy - 17α - androstanecarboxylic acid, γ-lactone.

*Example 3*

Fifteen grams of 3α-hydroxypregnan-11,20-dione (Bull. soc. chim. France, 1957, 1484) is dissolved in 200 ml. of ethanol containing 15–20 g. of methylamine, and the clear solution is allowed to stand for five hours. It is then shaken with 1.0 g. of platinum oxide catalyst and hydrogen at an initial pressure of 50 p.s.i. Hydrogenation commences after an induction period of one-half to one hour. When one mole of hydrogen is absorbed, the hydrogenation stops. The catalyst is filtered off and the alcohol is removed on the steam bath, the last traces off in vacuo. The residue is taken up in dilute hydrochloric acid and extracted three times with ether to remove nonbasic material. The amine, regenerated by the addition of alkali, is extracted with ether. The ether solution of the amine is washed twice with saturated salt solution, dried over sodium sulfate and then concentrated to ca. 50–60 ml. Upon cooling, crystals develop which are filtered and washed with cold ether to yield 3α-hydroxy-20-methylaminopregnan-11-one, M.P. 136–143° C.

A solution of 6.0 g. of 3α-hydroxy-20-methylaminopregnan-11-one in 300 ml. of chloroform is stirred with 300 ml. of 5% sodium hypochlorite solution for one hour. The hypochlorite is removed and the treatment repeated. The chloroform layer is separated, washed with water, dried and evaporated to give 3α-hydroxy-20-(N-methyl-N-chloroamino)-pregnan-11-one.

The above N-chloroamine (6.6 g.) is dissolved in 65 ml. of redistilled trifluoroacetic acid and irradiated with ultraviolet light under nitrogen for 40 minutes. The trifluoroacetic acid is evaporated in vacuo and the residual 3α - hydroxy-18-chloro-20-methylaminopregnan-11-one is dissolved in 75 ml. of methanol, made strongly basic with 25% methanolic potassium hydroxide. The solution is refluxed for one hour, concentrated in vacuo, poured into 500 ml. of water and extracted with chloroform. The chloroform extract is washed, dried and evaporated. The residue is boiled for two hours with 12.5 ml. of acetic anhydride, poured into 250 ml. of water and filtered. The filtrate is adjusted to pH 11 and extracted with chloroform. The extract is washed, dried and evaporated to give 3α-acetoxy-11-keto-5β-conanine.

A mixture of 1 g. of the conanine and 1.2 ml. of methyl iodide in 10 ml. benzene is heated at reflux for five hours. The mixture is worked up as in Example 1 to give the methiodide. This compound (1 g.) in methanol is passed over an anion exchange resin (Amberlite IRA–401, hydroxide form) to give a methanolic solution of the quaternary hydroxide. The crude residual product is then heated at 190° C. under 25 mm. pressure until effervescence stops to give 3α-acetoxy-11-keto-18-dimethylamino-20-pregnene. This olefin (750 mg.) and 4 ml. of methyl iodide is heated in acetonitrile for 24 hours to give a residue of the quaternary iodide which is dissolved in methanol and exchanged with hydroxide over an anion exchange resin as in Example 1. The quaternary hydroxide (2 g.) in 75 ml. of water is oxidized at ambient temperature with 2.5 g. of potassium permanganate. After filtration, evaporation of the aqueous solvent gives methyl-3α-acetoxy - 11 - keto-18-dimethylamino-17-etiocholanecarboxylate, betaine. The betaine (1.5 g.) in 250 ml. of dimethylformamide taken to pH 12 with 10% potassium hydroxide is heated at 100° C. for four hours. The solution is charcoaled and made acid to separate 3α,18 - dihydroxy - 11 - keto - 17 - etiocholanecarboxylic acid γ-lactone.

*Example 4*

A solution of 100 g. of 3β-hydroxy-11,20allopregnandione (German Pat. No. 927,030; Chem. Abst., 52, 873, 52, P. 2107) in 1 l. of absolute alcohol containing an excess of methylamine is allowed to stand at room temperature for one hour. Platinum oxide (3.0 g.) is added and the mixture is shaken with hydrogen at atmospheric pressure until one mole of hydrogen is absorbed. The catalyst is removed by filtration and the filtrate is taken to dryness in vacuo. The solid syrup obtained is suspended in acetone and filtered. The solid is dissolved in glacial acetic acid, diluted with a large volume of water and extracted with ether. The aqueous layer is adjusted to pH 11 with 40% sodium hydroxide solution. The solid which precipitates is filtered and dried in vacuo over phosphorus pentoxide. The pure product 3β-hydroxy-20-methylamino-11-allopregnanone is obtained by recrystallization from toluene, M.P. 187–189° C., $[\alpha]_D^{25} = 55.9°$ (c.=1.00 in chloroform). A solution of 12.1 g. of 3β-hydroxy-20-methylamino-11-allopregnanone in 600 ml. of methylene chloride is stirred with 600 ml. of 5% sodium hypochlorite solution for one hour, when the hypochlorite is removed and the treatment is repeated. The chloroform layer is separated, washed with water, dried and evaporated to yield 13.3 g. of colorless solid, 3β - hydroxy - 20 - (N-methyl-N-chloroamino)-11-allopregnanone.

The N-chloroamine is dissolved in 130 ml. of redistilled trifluoroacetic acid and subjected to ultraviolet irradiation under nitrogen atmosphere for 40 minutes. The trifluoroacetic acid is evaporated in vacuo and the residual 3β-hydroxy-18-chloro-20-methylamino-11-allopregnanone is dissolved in 150 ml. of methanol, made strongly basic with 25% methanolic potassium hydroxide solution and refluxed for one hour. The solution is concentrated in vacuo, poured into 1000 ml. of water and extracted with chloroform. The residue obtained from evaporation of the washed, dried chloroform solution is boiled for two hours with 25 ml. of acetic anhydride, poured into 500 ml. of water and filtered. The clear filtrate is made alkaline in the cold to pH 11 and extracted with chloroform. The chloroform layer is washed with water, dried and evaporated to give 3β-acetoxy-11-ketoconanine. Recrystallization from ethanol affords colorless needles, M.P. 186–189° C., $[\alpha]_D^{25} = 83.0°$ (c.=1.00).

The conanine (1.5 g.) is converted to the quaternary hydroxide as in Example 1. This compound is heated at 180° C. at 20 mm. to give 3β-acetoxy-11-keto-18-dimethyl-amino-20-allopregnene. After quaternization and oxidation as in Example 3, methyl 3β-acetoxy-11-keto-18-dimethylamino-17-androstanecarboxylate, betaine, is obtained. The betaine (750 mg.) in 100 ml. of dimethylacetamide at pH 13 is heated at 120° C. to give the desired 3β,18-dihydroxy-11-keto - 17 - androstanecarboxylic acid γ-lactone.

*Example 5*

A mixture of 17.3 g. of 3α-hydroxy-16α-methyl-11,20-pregnanedione [J. Am. Chem. Soc. 77, 2237 (1955)], and 0.5 g. of platinum oxide in 200 ml. of ethanol containing about 10% w./w. of methylamine is hydrogenated until the theoretical hydrogen absorption has occurred. The catalyst is filtered off and the filtrate is evaporated to dryness. The residue is taken up in chloroform, extracted with dilute acetic acid and the acid extract is made basic with dilute sodium hydroxide. Recrystallization of the separated free base gives 3α-hydroxy-16α-methyl-20α-methylaminopregnan-11-one. This compound (13 g.) is reacted with hypochlorite as in Example 4 to give 3α-hydroxy-16α-methyl-20-(N-methyl-N-chloroamino)-pregnan-11-one which is dissolved in 150 ml. of trifluoroacetic acid and irradiated with ultraviolet light for 40 minutes. The solvent is evaporated to give the N-chloro compound. After treatment with alcoholic potassium hydroxide and working up as in Example 3 without the acylation step, 3α-hydroxy-16α-methyl-11-keto-5β-conanine is obtained.

The conanine (2 g.) is converted into the quaternary hydroxide as in Example 1. This is heated at 175° C. at 15 mm. until the evolution of bubbles ceases. The resulting 3α-hydroxy-16α-methyl-11-keto-18-dimethyl-amino-20-pregnene is quaternized to the hydroxide and oxidized as described in Example 3 to give methyl 3α-hydroxy-16α-methyl-11-keto-18- dimethylamino - 17-etiocholanecarboxylate, betaine, which (500 mg.) is dissolved in 50 ml. of dimethylacetamide at pH 12 and heated for several hours at 100° C. to give 3α,18-dihydroxy-16α-methyl-11-keto-17-etiocholanecarboxylic acid γ-lactone.

Example 6

A mixture of 8 g. of 3α,11β-dihydroxy-6β-methyl-pregnan-20-one [produced by the reduction of 6β-methyl-11β-hydroxyprogesterone (U.S. Pat. No. 2,864,837) by the method of U.S. Pat. No. 2,838,492] and 0.25 g. of platinum oxide in 100 ml. of ethanol and an excess of ethylamine is hydrogenated until the theoretical amount of hydrogen has been absorbed. Working up as in Example 3 gives the 20-ethylamino compound which (7 g.) is reacted with hypochlorite solution, irradiated in trifluoroacetic acid and reacted with alkali in succession as in Example 3 to give N-ethyl-3α,11β-dihydroxy-6β-methyl-5β-conanine.

This compound (1.5 g.) is reacted with ethyl iodide and then passed over an anion exchange resin to form the quaternary hydroxide as in Example 1. Heating the salt at 200° C. at 100 mm. gives 3α,11β-dihydroxy-6β-methyl-18-dimethylamino-20-pregnene, which is quaternized with ethyl iodide, exchanged over Amberlite IRA–400 to the hydroxide and oxidized with potassium permanganate as in Example 1 to give ethyl-3α,11β-dihydroxy-6β-methyl - 18-diethylamino-17 - etiocholanecarboxylate, betaine. The betaine (750 mg.) is dissolved in dimethylformamide at pH 12 and heated at 110° C. to give 3α,11β,18-trihydroxy-6β-methyl - 17-etiocholanecarboxylic acid γ-lactone.

Example 7

A mixture of 10.4 g. of 3β,6β-dihydroxyallopregnan-20-one (J. Org. Chem., 13, 214 (1948), J. Am. Chem. Soc. 68, 1859), and 0.25 g. of platinum oxide in 100 ml. of ethanol containing 10% w./w. of methylamine is hydrogenated until the theoretical hydrogen absorption has occurred. The catalyst is removed and the solvent evaporated in vacuo. The residue comprising the crude 20-methylamines is converted to the hydrochlorides and the pure free bases obtained as described in Example 3. Fractional recrystallization of the free bases gives 3β,6β-dihydroxy-20α-methylaminoallopregnane which is converted to 3β,6β-dihydroxyconanine as in Example 3. The conanine (8 g.) is reacted with 8 ml. of methyl iodide in benzene solution at reflux and exchanged over Amberlite IRA–400 to the hydroxide form as in Example 4. The quaternary hydroxide residue (7 g.) is heated at 185–195° C. at 22 mm. pressure to give the 17-olefin. The olefin is purified by recrystallization and then re-quaternized with methyl bromide and converted to the hydroxide by ion exchange. Oxidation of the quaternary (2 g.) in 100 ml. of water with an excess of potassium permanganate gives methyl 3β,6β-dihydroxy-18-dimethylaminoandrostanecarboxylate, betaine which (1.1 g.) is dissolved in 150 ml. of dimethylformamide at pH 12 and heated on the steam bath. Evaporation gives 3β,6β-18-trihydroxy-17-androstanecarboxylic acid γ-lactone.

Example 8

3α,16α-dihydroxy-20-pregnanone (16.6 g., Helv. chim. acta., 41, 1667 (1958)) and 0.5 g. of platinum oxide are added to 200 ml. of ethanol containing 10% w./w. of methylamine and the mixture is hydrogenated until the theoretical amount of hydrogen is absorbed. The catalyst is filtered off and the filtrate evaporated to dryness. The residual 20-methylamines are further worked up as described in Example 3 to give 3α,16α-dihydroxy-20α-methylaminopregnane. This secondary amine is N-chlorinated with hypochlorite solution, irradiated in trifluoroacetic acid and reacted with alkali as in Example 3 to give 3α,16α-dihydroxy-5β-conanine.

The conanine (2 g.) is reacted with methyl iodide in toluene to form the quaternary halide, then in methanol, passed over hydroxide exchange resin (Amberlite IRA–400) to form the quaternary hydroxide. The residue, after evaporation of the methanol, is heated at 175–185° C. at 40 mm. until effervescence stops to give 3α,16α-dihydroxy-18-dimethylamino-20-pregnene. The olefin (750 mg.) is oxidized in water with an excess of aqueous potassium permanganate. The manganese dioxide is separated by filtration to give the betaine by evaporation of the water. Heating on the steam bath in dimethylformamide gives 3α,16α-18-trihydroxy-17-etiocholanecarboxylic acid γ-lactone.

Example 9

A solution of 2.8 g. of 3α-hydroxypregnan-20-one (Chem. Abst., 52, 8329) in 50 ml. of ethanol containing 10% w./w. of methylamine is shaken under hydrogen in the presence of 200 mg. of paltinum oxide until the theoretical amount of hydrogen is absorbed. The turbid mixture is clarified with ethanol, filtered and evaporated in vacuo. The residue is recrystallized to give colorless tetragonal prisms of 3α-hydroxy-20-methylaminopregnane, M.P. 180–205° C.

A solution of 13.3 g. of 3α-hydroxy-20α-methylaminopregnane in 200 ml. of chloroform is stirred with 300 ml. of 5% sodium hypochlorite solution for one-half hour, when the hypochlorite is removed and the treatment is repeated. The chloroform layer is separated, washed with water, dried and evaporated to yield a white amorphous solid, 3α-hydroxy-20α-methylchloroaminopregnane, M.P. 119–123° C.

This chloramine (8.4 g.) is dissolved in 80 ml. of redistilled trifluoroacetic acid and subjected to ultraviolet irradiation under nitrogen atmosphere for 45 minutes. The trifluoroacetic acid is evaporated in vacuo and the residual oil is dissolved in 200 ml. of methanol made strongly basic with 25% methanolic potassium hydroxide solution. The solution is refluxed for one hour, concentrated in vacuo, poured into 300 ml. of water and extracted with chloroform. The residue obtained from evaporation of the washed, dried chloroform solution is boiled for two hours with 20.8 ml. of acetic anhydride, poured into 500 ml. of water and filtered. The clear filtrate is made alkaline in the cold to pH 11 and extracted with chloroform. The chloroform layer is washed with water, dried and evaporated to give a residual oil. A 1.0 g. sample of this residual oil is removed, dissolved in ether, and treated with ethereal hydrogen chloride until acid. The white hydrochloride salt precipitates out and is filtered to yield 1.1 g. of salt. The salt is dissolved in a very small volume of alcohol and cooled to yield a crystalline solid which is recrystallized from alcohol-ether to yield 3α-acetoxy-5β-conanine hydrochloride, M.P. 295° C., dec., $[\alpha]_D^{20}+47.0°$ (c.=1.00 chloroform).

The conanine (1 g.) is reacted with 2 ml. of methyl iodide in 100 ml. of benzene at reflux for three hours. After dilution with ether the separated quaternary salt is isolated by filtration and dissolved in methanol for exchanging with hydroxide ion on Amberlite IRA–400. The quaternary hydroxide is heated at 190° C. at 25 mm. pressure to form the 3α-acetoxy-18-dimethylamino-20-pregnene. The olefin (750 mg.) is quaternized with methyl chloride and exchanged, then oxidized in water with potassium permanganate to methyl 3α-acetoxy-18-dimethylamino-17-etiocholanecarboxylate, betaine. The betaine (450 mg.) is heated on the steam bath in 20 ml.

of dimethylformamide at pH 12 to give 3α,18-dihydroxy-17-etiocholanecarboxylic acid, γ-lactone.

The lactone is dissolved in pyridine and reacted with an excess of acetic anhydride to give the 3α-acetate upon quenching.

Example 10

To 7.2 g. of 5α-hydroxy-6β-methyl-3,11,20-allopregnatrione [J. Am. Chem. Soc., 78, 6213 (1956)] in 100 ml. of methanol is added 0.4 g. of sodium borohydride dissolved in pyridine. After 10 minutes an excess of dilute hydrochloric acid is added and the mixture extracted with methylene chloride. Evaporation of the solvent and chromatography of the residue over alumina yields 3β,5α-dihydroxy-6β-methyl-11,20-allopregnandione.

The dione prepared as above (18.0 g.) and 0.5 g. of platinum oxide are added to 200 ml. of ethanol containing 10% w./w. of methylamine and the mixture hydrogenated until one mole of hydrogen is absorbed. The catalyst is removed by filtration and the filtrate evaporated to dryness. Treatment of the residue as described in Example 1 yields 3β,5α-dihydroxy-6β-methyl-20α-methylaminoallopregnan-11-one. The 20-methylamine (9 g.) is N-chlorinated, irradiated and treated with alkali to give 3β,5α-dihydroxy-6β-methyl-11-keto-5β-conanine. Following the procedure of Example 1, the conanine is converted to the quaternary hydroxide, decomposed at 195° C. at 22 mm. to give the 17-olefin. This compound is then requaternized, converted to the hydroxide and oxidized with permanganate as in Example 1 to give methyl 3β,5α-dihydroxy-6β-methyl-11-keto-18-dimethylamino-17-androstanecarboxylate, betaine. The betaine (2.3 g.) is dissolved in 300 ml. of purified dimethylformamide, adjusted to pH 11 and heated on the steam bath for three hours. Evaporation gives 3β,5α,18-trihydroxy-6β-methyl-11-keto-17-androstanecarboxylic acid, γ-lactone.

Example 11

In like manner as in Example 3, the 6β-fluoro-3α-hydroxy-11-ketopregnan-20-one [produced by the reduction of 6β-fluoro-11-ketoprogesterone (U.S. Pat. No. 2,838,501) by the method of U.S. Pat. No. 2,838,492] is converted to 3α-hydroxy-6β-fluoro-11-keto-5β-conanine and then into methyl 6β-fluoro-3α-hydroxy-11-keto-18-dimethylamino-17-etiocholanecarboxylate, betaine which is heated at 100° C for several hours in dimethylformamide solution at pH 12 to give 6β-fluoro-3α-hydroxy-11-keto-17-etiocholanecarboxylic acid, γ-lactone

Example 12

Using the same procedure as in Example 6, but using methylamine and methyl iodide reactants in excess, 3α,11β-dihydroxypregnan-20-one (7 g. Endocrinology, 57, 646 (1955)) is converted to N-methyl-3α,11β-dihydroxy-5β-conanine. This compound (1.4 g.) is quaternized with an excess of methyl iodide, converted to the hydroxide, decomposed by heating at 180° C. at 15 mm., requaternized and oxidized to give methyl 3α,11β-dihydroxy-18-dimethylamino-17-etiocholanecarboxylate, betaine. The betaine is heated in alkaline dimethylacetamide at 120° C. to give 3α,11β,18-trihydroxy-17-etiocholanecarboxylic acid, γ-lactone.

Example 13

A solution of 2 g. of 3α-hydroxy-11-keto-5β-conanine, prepared by hydrolyzing 3α-acetoxy-11-keto-5β-conanine with methanolic sodium hydroxide, in 100 ml. of pyridine is reacted with 2 g. of chromium trioxide by heating briefly on the steam bath and standing at room temperature overnight. The mixture is quenched to separate the desired 3,11-diketo-5β-conanine.

The conanine (1.5 g.) is converted into the methiodide and the quaternary hydroxide as in Example 1. This residue is heated at 180° C. under 20 mm. pressure until effervescence stops to give the 17-olefin. This compound (1.1 g.) is converted into the methiodide and hydroxide again as in Example 1, then oxidized with aqueous potassium permanganate to give methyl 3,11-diketo-18-dimethylamino-17-etiocholanecarboxylate, betaine which is heated in 100 ml. of dimethylformamide at pH 12 on the steam bath for several hours to give 3,11-diketo-18-hydroxy-17-etiocholanecarboxylic acid γ-lactone.

Example 14

A solution of 1 g. of 3β,18-dihydroxy-17β-androstanecarboxylic acid, γ-lactone in 500 ml. of ether is reacted with an excess of a 3 M solution of methyl magnesium bromide in ether. The reaction mixture is stirred at room temperature for several hours, then quenched in an ice-hydrochloric acid mixture. The ether extracts are combined and evaporated to give 3β,18-dihydroxyallopregnane. Alternatively, the 3β-hydroxy moiety is acylated with acetic anhydride in pyridine to give the acetate prior to reaction with the Grignard reagent. This pregnane is an important intermediate in preparing 18-oxygenated progesterone congeners, such as by oxidation and insertion of the $\Delta^{4,5}$ double bond. Also, the pregnane is oxidized to the 3,20-dione, a central nervous system depressant.

Example 15

A mixture of 2.0 g. of lithium aluminum hydride, 4.3 g. of 3β-acetoxy-11-keto-5α-conanine and 50 ml. of tetrahydrofuran is boiled for one hour and then treated cautiously with 8 ml. of water. The suspension is filtered and the filtrate is evaporated to give crude 3β,11β-dihydroxy-5α-conanine, M.P. 102–105° C.

A solution of 1.3 g. of 3β,11β-dihydroxy-5α-conanine in benzene is quaternized with methyl iodide to give colorless needles of 3β,11β-dihydroxy-5α-conanine methiodide, M.P. 278–279° C.

A methanolic solution of 1.2 g. of the methiodide prepared as above is passed through 10 g. of Amberlite IRA–400 in the hydroxide form and evaporated. The residual quaternary ammonium hydroxide is heated at 170° C. for ten minutes and recrystallized to give 3β,11β-dihydroxy-18-dimethylamino-20-allopregnene, M.P. 178–182° C.

A solution of 400 mg. of the olefin in 30 ml. of acetonitrile and 3 ml. of methyl iodide is heated at reflux for 24 hours. Evaporation of the solution gives the methiodide.

The 3β,11β-dihydroxy-18-trimethylammonium-20-allopregnene iodide is dissolved in methanol and passed over an Amberlite IRA–400 resin (hydroxide) column. Evaporation of the methanol leaves the quaternary hydroxide.

A solution of 2.0 g. of the quaternary in 50 ml. of water is oxidized at ambient temperature with 2.5 g. of potassium permanganate. Filtration and evaporation of the solvent gives methyl 3β,11β-dihydroxy-18-dimethylamino-17β-androstanecarboxylate, betaine.

The betaine (1.5 g.) is dissolved in 250 ml. of dimethylformamide, adjusted to pH 12 with 10% potassium hydroxide and heated on the steam bath for four hours. The solution is charcoaled and made acid with concentrated hydrochloric acid to separate 3β,11β-18-trihydroxy-17β-androstane carboxylic acid, γ-lactone.

Example 16

Amberlite IRA–400 in the chloride form (100 g.) is packed into a glass chromatography column and 10% sodium hydroxide solution is passed through until the resin is free of chloride ion which is determined by assaying the eluate for chloride ion by acidification with nitric acid and addition of silver nitrate solution. When no silver chloride precipitates, the resin is free of chloride ion. The resin is then washed with distilled water until the washings are neutral. Further washing with methanol and air drying gives the Amberlite IRA–400 in the hydroxide form.

What is claimed is:

1. The method of preparing steroidal 17→18 γ-lactones which comprises heating until the effervescence ceases the quaternary hydroxide derivative of a conanine having the following structural formula:

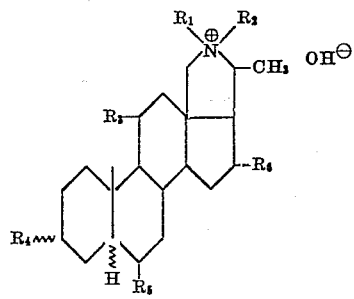

in which $R_1$ and $R_2$ are lower alkyl having from 1 to 4 carbon atoms; $R_3$ is a member selected from the group consisting of hydrogen, hydroxy and, when taken with the carbon atom to which it is attached, keto; $R_4$ is a member selected from the group consisting of hydroxyl, acetoxy and, when taken with the carbon to which it is attached, keto; ⌇ is a configuration selected from the group consisting of α and β; $R_5$ is a member selected from the group consisting of hydrogen, methyl, fluoro and hydroxyl; and $R_6$ is a member selected from the group consisting of hydrogen, methyl and hydroxyl, to form a 17-vinyl steroid having the following structural fromula:

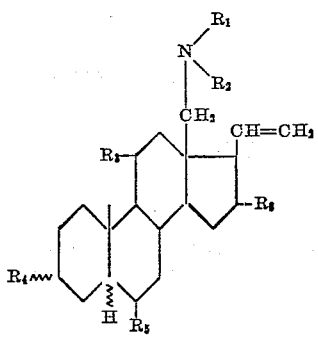

in which $R_{1-6}$ and ⌇ are as defined hereabove; reacting said 17-vinyl steroid with a reactive lower alkyl halide having from 1 to 4 carbon atoms to form a quaternary ammonium compound having the following structural formula:

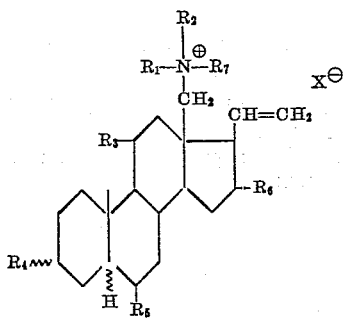

in which $R_{1-6}$ and ⌇ are as defined hereabove, $R_7$ is an alkyl having from 1 to 4 carbon atoms and $X^\ominus$ is a reactive halogen atom having a minimum atomic weight of 35; reacting said quaternary ammonium halide with the hydroxide form of an anion exchange resin to form the quaternary hydroxide; oxidizing said quaternary hydroxide to form a betaine of the following structural formula:

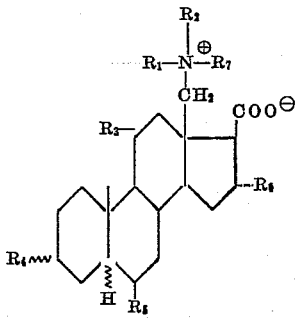

in which $R_{1-7}$ and ⌇ are as defined hereabove; and heating at from about 50–150° C. said betaine to form a steroidal 17→18 γ-lactone having the following structural formula:

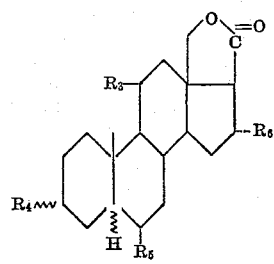

in which $R_{3-6}$ and ⌇ are as defined hereabove.

2. A chemical compound having the following structural formula:

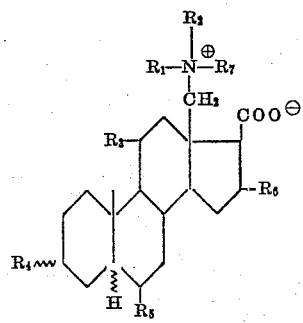

in which $R_1$ and $R_2$ are lower alkyl having from 1 to 4 carbon atoms; $R_3$ is a member selected from the groups consisting of hydrogen, hydroxy and, when taken with the carbon atom to which it is attached, keto; $R_4$ is a member selected from the group consisting of hydroxyl, acetoxy and, when taken with the carbon to which it is attached, keto; ⌇ is a configuration selected from the group consisting of α and β; $R_5$ is a member of the group consisting of hydrogen, methyl, fluoro and hydroxyl; and $R_6$ is a member selected from the group consisting of hydrogen, methyl and hydroxyl; and $R_7$ is an alkyl having from 1 to 4 carbon atoms.

3. A chemical compound according to claim 2 in which $R_3$ is a keto group when taken together with the carbon atom to whch it is attached.

4. A chemical compound according to claim 2 in which $R_3$ is hydroxyl.

5. A chemical compound having the following structural formula:

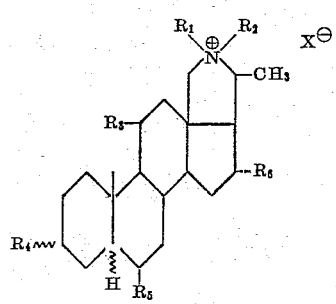

in which $R_1$ and $R_2$ are lower alkyl having from 1 to 4 carbon atoms; $R_3$ is a member selected from the group consisting of hydroxy and, when taken with the carbon atom to which it is attached, keto; $R_4$ is a member selected from the group consisting of hydroxyl, acetoxy and, when taken with the carbon to which it is attached, keto; ξ is a configuration selected from the group consisting of α and β; $R_5$ is a member selected from the group consisting of hydrogen, methyl, fluoro and hydroxy; and $R_6$ is a member selected from the group consisting of hydrogen, methyl and hydroxyl; and $X^\ominus$ is an anion selected from the group consisting of a reactve halide of a minimum atomic weight of 35 and hydroxide.

6. A chemical compound of the class consisting of a free base and its quaternary salts, the free base having the following structural formula:

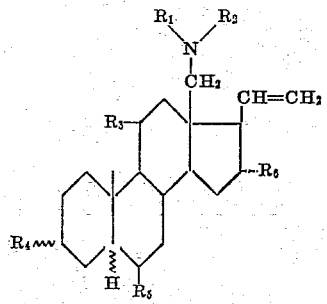

in which $R_1$ and $R_2$ are lower alkyl having from 1 to 4 carbon atoms; $R_3$ is a member selected from the groups consisting of, hydroxy and, when taken with the carbon atom to which it is attached, keto; $R_4$ is a member selected from the group consisting of hydroxyl, acetoxy and, when taken with the carbon to which it is attached, keto; ξ is a configuration selected from the group consisting of α and β; $R_5$ is a member selected from the group consisting of hydrogen, methyl, fluoro and hydroxyl; and $R_6$ is a member selected from the group consisting of hydrogen, methyl and hydroxyl.

7. A chemical compound having the following structural formula:

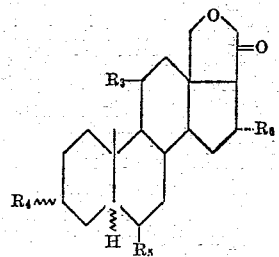

in which $R_3$ is a member selected from the group consisting of hydrogen, hydroxy and, when taken with the carbon atom to which it is attached, keto; $R_4$ is a member selected from the group consisting of hydroxyl, acetoxy and, when taken with the carbon to which it is attached, keto; ξ is a configuration selected from the group consisting of α and β; $R_5$ is a member selected from the group consisting of hydrogen, methyl, fluoro and hydroxyl; and $R_6$ is a member selected from the group consisting of hydrogen, methyl and hydroxyl, at least one of $R_5$ and $R_6$ being a member other than hydrogen.

8. The process of preparing a steroidal γ-lactone having the following fundamental formula:

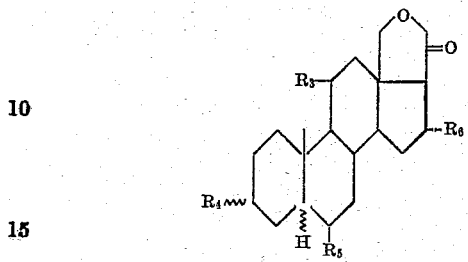

in which $R_3$ is a member selected from the group consisting of hydrogen, hydroxy and, when taken together with the carbon atom to which it is attached, keto; $R_4$ is a member selected from the group consisting of hydroxyl and, when taken together with the carbon atom to which it is attached, keto; ξ is a configuration selected from the group consisting of α and β; $R_5$ is a member selected from the group consisting of hydrogen, methyl, fluoro and hydroxyl and $R_6$ is a member selected from the group consisting of hydrogen, methyl and hydroxyl; consisting of heating at about 50–150° C. at an alkaline pH a steroidal betaine having the following fundamental formula:

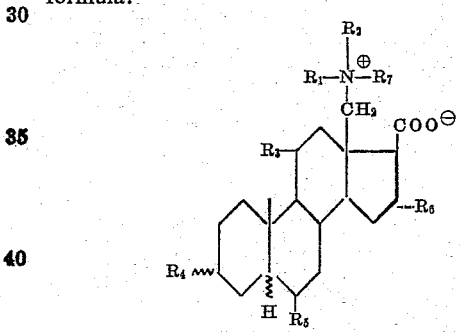

in which $R_1$, $R_2$ and $R_7$ are lower alkyl having from 1 to 4 carbon atoms and $R_{3-6}$ and ξ are as defined hereabove.

9. A chemical compound having the following fundamental formula:

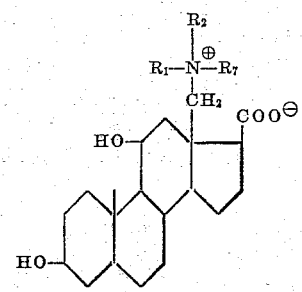

in which $R_1$, $R_2$ and $R_7$ are lower alkyl having from 1 to 4 carbon atoms.

10. A chemical compound having the following fundamental formula:

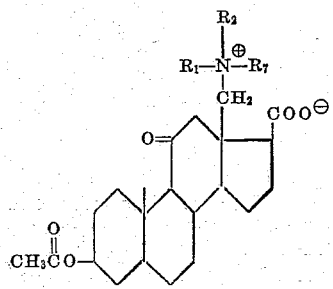

in which $R_1$, $R_2$ and $R_7$ are lower alkyl having from 1 to 4 carbon atoms.

11. Methyl 6β-fluoro-3α-hydroxy-11-keto-18-dimethylamino-17-etiocholanecarboxylate, betaine.

12. Methyl 3β,5α - dihydroxy - 6β - methyl - 11 - keto-18-dimethylamino-17-androstanecarboxylate, betaine.

13. Methyl 18 - dimethylamino - 3β - hydroxy - 17-androstanecarboxylate, betaine.

14. A quaternary salt having the following fundamental formula:

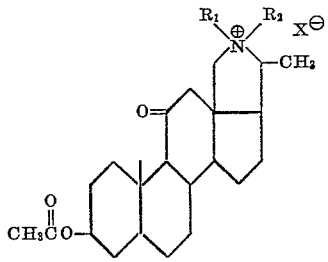

in which $R_1$ and $R_2$ are lower alkyl having from 1 to 4 carbon atoms and $X^\ominus$ represents an inorganic anion.

15. A quaternary salt having the following fundamental formula:

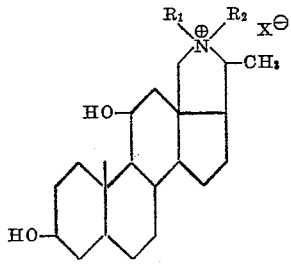

in which $R_1$ and $R_2$ are lower alkyl having from 1 to 4 carbon atoms and $X^\ominus$ represents an inorganic anion.

16. 3β-acetoxy-11-ketoconanine methiodide.

17. 3α-acetoxy-11-keto-5β-conanine methiodide.

18. A chemical compound having the following fundamental formula:

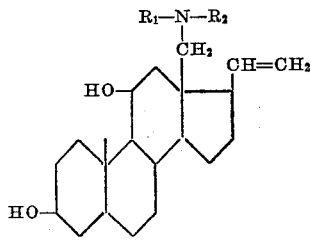

in which $R_1$ and $R_2$ are lower alkyl having from 1 to 4 carbon atoms.

19. 3β,11β - dihydroxy - 18 - trimethylammonium - 20-allopregnene iodide.

20. A chemical compound having the following fundamental formula:

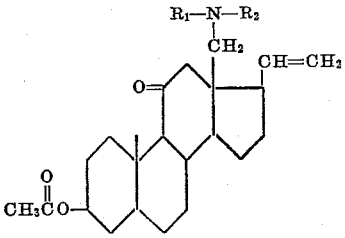

in which $R_1$ and $R_2$ are lower alkyl having from 1 to 4 carbon atoms.

21. 3α,11β - dihydroxy - 6β - methyl - 18 - dimethylamino-20-pregnene.

22. 3α,16α,18 - trihydroxy - 17 - etiocholanecarboxylic acid γ-lactone.

23. 3α,18 - dihydroxy - 16α - methyl - 11 - keto - 17-etiocholanecarboxylic acid γ-lactone.

References Cited in the file of this patent
UNITED STATES PATENTS

| | | |
|---|---|---|
| 2,904,545 | Reichstein et al. | Sept. 15, 1959 |
| 2,912,432 | Pappo et al. | Nov. 10, 1959 |

UNITED STATES PATENT OFFICE
CERTIFICATE OF CORRECTION

Patent No. 3,004,965                      October 17, 1961

James F. Kerwin et al.

It is hereby certified that error appears in the above numbered patent requiring correction and that the said Letters Patent should read as corrected below.

Column 2, line 16, strike out "in each of which formulas."; line 49, after "available" insert a period; same column 2, line 17, beginning with "Preferably, the compounds" strike out all to and including "are readily available.", in line 49, same column 2, and insert the same between lines 53 and 54, column 3; columns 1, 2 and 3, the structures of formulas I, II, III, and IV, should appear as being joined to the following intermediate with a reaction arrow ( $\longrightarrow$ ) in standard reaction sequence manner.

Signed and sealed this 17th day of April 1962.

(SEAL)
Attest:

ESTON G. JOHNSON                      DAVID L. LADD

Attesting Officer                      Commissioner of Patents